3,085,075
CURED EPOXY RESINS
Herbert Lockshin, East Paterson, N.J., and Carlton H. Bascom, Staten Island, N.Y., assignors to Lancaster Chemical Corporation, Carlstadt, N.J., a corporation of New York
No Drawing. Filed May 14, 1958, Ser. No. 735,112
7 Claims. (Cl. 260—18)

This invention relates to novel compositions and to the method of protecting electrical connections by means of cured epoxy resins.

Epoxy resins are being investigated for various applications. In some uses the resin is cured by means of a hardening or curing agent. The type of curing agent is selected on the basis of the requirements of a particular use. In the case of covering or encapsulating electrical connections, it is important that the cured resin be tough, flexible and transparent, if possible. The transparency would permit visual inspection of the electrical connection, whereas the toughness and flexibility are needed to overcome stress conditions which arise when the connection is bent or struck by other objects. Heretofore, it has not been possible to obtain a cured epoxy resin with all of such properties.

Another important problem is the matter of handling. If the resin per se were in a solid state, it would be necessary to melt it for reaction with the curing agent. The same difficulty exists when the curing agent is a solid. It would be advantageous to handle both resin and curing agent as liquids. The present invention is concerned with a novel curing agent which overcomes substantially the objections made hereinabove.

Thus, an object of this invention is to provide a novel curing agent.

Another object is to provide a cured epoxy resin which has exceptional properties as regards encapsulating electrical connections.

Still another object is to provide a novel method of curing epoxy resins.

Other objects and advantages of this invention will become apparent from the following description of the invention.

In accordance with this invention, the novel curing agent is an amido amine of an unsaturated fatty acid containing about 12 to 22 carbon atoms and a tetra-alkylene pentamine. The alkylene groups in the pentamine may be ethylene, propylene, butylene, etc. Tetra-ethylene pentamine is a specific example of the pentamine. For some unexplainable reason, the pentamine, when reacted with the fatty acid or ester, produces an amido amine which is liquid and easily handled, whereas the lower amines do not. Another surprising result is that our amido amino produces a cured epoxy resin which is transparent, flexible and strong, whereas the amido amines made from the lower amines produce brittle and opaque cured resins. The amido amine of the present invention can be represented by the following structural formula:

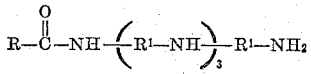

wherein R is the unsaturated fatty radical containing 11 to 21 carbon atoms and R¹ is an alkene group.

The pentamine is reacted with an unsaturated fatty acid or an aliphatic ester thereof which contains about 12 to 22 carbon atoms in the acid radical. The starting material may be a simple ester or an ester of a glycol or glycerol. Specific examples of acid starting materials are oleic, linoleic, linolenic, methyl linoleate, ethyl oleate, or mixtures of the same, such as those which occur naturally or those prepared synthetically. Other acids may be present, but if the amido amine produced from them remains in the final product, they tend to affect adversely the properties of the cured resin. In this regard, stearic acid gives an amido amine which is solid at ambient temperature and the resin cured with it is opaque and brittle. Generally, the starting material may contain up to about 10% by weight of acid material which is not an unsaturated fatty acid of the desired type.

The amido amine is prepared by reacting the pentamine and acid or ester at about 125° to 190° C. and at a pressure of about 2 to 50 p.s.i., although atmospheric pressure is adequate. The reaction mixture may be exposed to the atmosphere, but if it is protected with an inert gas such as $CO_2$, steam, normally gaseous hydrocarbon, argon, etc., the color of the amido amine product may be improved. The reactants are charged to the reaction vessel in relative proportions of about 0.8 to 1.0 mol of acid or ester starting material per mol of pentamine. It is preferred that the starting material be an acid in order to minimize side reactions. The time of reaction can vary depending upon the other conditions of reaction. Generally, about 4 to 8 hours are sufficient for complete or substantially complete reaction.

The amido amine is used to cure an epoxy resin. The curing treatment is conducted by using about 50 to 100 parts by weight of curing agent per 100 parts by weight of epoxy resin. The curing treatment may be started at ambient level, and due to the exothermic heat of reaction, the ultimate temperature may reach about 100° to 150° C. If desired, the curing treatment can be accelerated by heating, at the outset, the mixture of amido amine and epoxy resin. For this purpose, the initial temperature may be raised by auxiliary heating means to about 40° to 60° C.

The epoxy resin can be any one of the conventional types. For example, the polyhydroxy compound can be bisphenol A, bisphenol F, resorcinol, hydroquinone, pyrocatechol, saligenin, phloroglucinol, trihydroxyl diphenyl dimethyl methane, 4,4 dihydroxy biphenyl, dihydroxy diphenyl sulfone, ethylene glycol, novalac resins, 2,3 butanediol, erythritol, glycerol, etc. The other reactant is, for example, epichlorohydrin, dichlorohydrin, 1,2-dichloro-3 hydroxy propane, butadiene dioxide, diglycidyl ether, etc. The manner in which these materials are reacted to produce epoxy resins are well known to those skilled in the art. For our purpose, the molecular weight of the resin may vary over a wide range, for example, about 350 to 4,000; however the present invention is particularly applicable to liquid resins or those which have a molecular weight of about 350 to 700. The epoxy resin which is widely used in the present invention is prepared from epichlorohydrin and bisphenol A. This resin has the following structural formula:

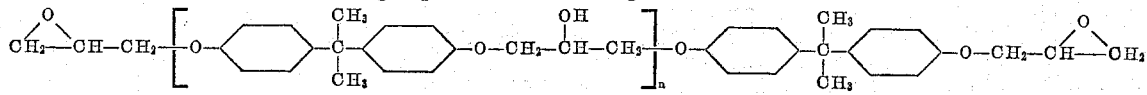

To provide a better understanding of the present invention, the following examples are given.

A comparison was made between the pentamine starting material of the present invention and lower molecular weight amine to determine if any differences existed as among the curing properties of the various amido amine products.

*Example 1*

284 grams of a tall oil distillate containing 97% fatty acids, 1% rosin acid and 2% unsaponifiables were heated in an open flask with 70.1 grams of 85.8% by weight ethylenediamine solution to a temperature of about 325° F. The reaction mixture was held at this temperature for about one hour. The resultant product was solid at ambient temperature.

To determine the curing properties of the amido amine product, 67 parts by weight of the amido amine were combined with 100 parts of epoxy resin, which had been prepared from bisphenol A and epichlorohydrin. The epoxy resin had a molecular weight of approximately 400, and it was liquid at ambient temperature. The curing treatment was complete after 72 hours. The flexibility of a film of cured resin was tested by bending it through an angle of 180°. It was found that the cured film cracked when bent in this fashion. The color of the cured film was too opaque to permit seeing through it. Hence it would not be desirable for use in covering electrical connections.

*Example 2*

104 grams of diethylene triamine were reacted with 284 grams of the tall oil distillate described in Example 1 and under conditions similar to those described in that example. The resultant reaction product was solid at ambient temperature.

As in Example 1, 67 parts of the amido amine product were combined with 100 parts of the epoxy resin described in Example 1. A film of cured resin was bent through an angle of 180° and, as in the case of Example 1, it cracked. Also, the cured film was too opaque for use in covering electrical connections.

*Example 3*

291 grams of tall oil distillate containing 92% fatty acids, 4% rosin acid and 4% unsaponifiables were mixed with 146 grams of triethylene tetramine. The mixture was reacted under conditions similar to those described in Example 1. The resultant product was solid at ambient temperature.

67 parts of the product were combined with 100 parts of the epoxy resin which is described in Example 1. A cured film of the epoxy resin cracked when bent through an angle of 180°. The film was also opaque and so not suitable for encapsulating electrical connections.

*Example 4*

284 grams of a tall oil distillate containing 97% fatty acids were admixed with 189 grams of tetraethylene pentamine. The mixture was reacted under conditions similar to those described in Example 1. The resultant product was a fluid at ambient temperature, and it had a viscosity of 600 centipoises at 80° F.

67 parts of the product were combined with 100 parts of epoxy resin of the type described in Example 1. A cured film of epoxy resin did not crack when bent through an angle of 180°. The cured film was clear or transparent, and hence it was ideally suited for encapsulating electrical connections.

Another significant advantage in using an amido amine derived from an unsaturated fatty acid containing 12 to 22 carbon atoms and a polyalkylene pentamine is that substantially faster cure of epoxy resins is obtained. In the examples given above, a tack free cure was obtained overnight, whereas this was not true in the case of any other hardening agent, including the one given in Example 6.

*Example 5*

In this experiment the procedure of Example 4 was followed except that carbon dioxide was bubbled through the reaction mixture to form a protective blanket over the surface of the mixture. It was found that the color of the reaction product did improve by this preparation. However, there was no effect on the viscosity of the reaction product or on its ability to cure an epoxy resin. The same result was found with regard to the transparency of the cured film.

Other types of fatty acids were tried in order to determine the permissible variations in the type of acid starting material which could be used.

*Example 6*

In this experiment stearic acid was used as the starting material for reaction with tetraethylene pentamine in the same molar ratio as given in Example 4. The resultant amido amine product was a solid at ambient temperature. A cured film of epoxy resin, following the same procedure as described in Example 4, cracked when bent through an angle of 180°. The cured film was too opaque for use in covering electrical connections.

While the cured epoxy resins of this invention are ideally suited for covering electrical connections, they can be employed for other uses. By reason of their excellent adhesive properties, the cured resins can be used as coatings or laminates for metals, paper, ceramics, cloth, etc. They also can be used as castings for various applications. The cured resins can be admixed with metal or mineral fillers to form plastic tooling. Other uses will be evident to persons skilled in this art.

Having thus provided a written description of the invention along with specific examples, it should be understood that the invention is defined by the appended claims.

We claim:

1. A transparent cured resin prepared from reacting an epoxy resin having terminal epoxy groups with an amido amine of an unsaturated fatty acid containing about 12 to 22 carbon atoms and a tetraalkylene pentamine having from 2–4 carbon atoms in the alkylene groups.

2. A transparent cured resin prepared from reacting a liquid epoxy resin having terminal epoxy groups with an amido amine of an unsaturated $C_{18}$ fatty acid and a tetraalkylene pentamine having from 2–4 carbon atoms in the alkylene groups.

3. A transparent cured resin prepared from reacting a bis-(4-hydroxyphenyl) dimethyl methane-epichlorohydrin resin having terminal epoxy groups with an amido amine of an unsaturated $C_{18}$ fatty acid and a tetraalkylene pentamine having from 2–4 carbon atoms in the alkylene groups.

4. The method of curing an epoxy resin having terminal epoxy groups which comprises mixing with the resin an amido amine having the formula:

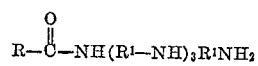

wherein R is an unsaturated fatty radical containing 11–21 carbon atoms and $R^1$ is an alkylene group containing from 2–4 carbon atoms.

5. The method of claim 4 wherein R contains 17 carbon atoms and $R^1$ is an ethylene group.

6. A method of protecting electrical connections which comprises encapsulating the same with a transparent cured resin prepared from reacting a liquid epoxy resin, having terminal epoxy groups and an amido amine of an unsaturated $C_{18}$ fatty acid and a tetraalkylene pentamine having from 2–4 carbon atoms in the alkylene groups.

7. The method of claim 6 wherein the epoxy resin is bis-(4-hydroxyphenyl) dimethyl methane epichlorohydrin resin having terminal epoxy groups and the alkylene pentamine is tetraethylene pentamine.

References Cited in the file of this patent

UNITED STATES PATENTS

| | | |
|---|---|---|
| 2,609,380 | Goldstein et al. | Sept. 2, 1952 |
| 2,615,008 | Greenlee | Oct. 21, 1952 |
| 2,668,807 | Greenlee | Feb. 9, 1954 |
| 2,705,223 | Renfrew et al. | Mar. 29, 1955 |
| 2,707,708 | | |
| 2,760,944 | | |
| 2,764,603 | | |
| 2,765,324 | | |
| 2,765,325 | | |
| 2,881,194 | | |
| 2,899,397 | | |
| 2,909,494 | | |
| 2,930,773 | | |
| 2,707,708 | | May 3, 1955 |
| 2,760,944 | Wittcoff | Aug. 28, 1956 |
| 2,764,603 | Greenlee | Sept. 25, 1956 |
| 2,765,324 | Ahlbrecht | Oct. 2, 1956 |
| 2,765,325 | Niederhauser | Oct. 2, 1956 |
| 2,881,194 | Niederhauser | Apr. 7, 1959 |
| 2,899,397 | Peerman et al. | Aug. 11, 1959 |
| 2,909,494 | Aelony et al. | Oct. 20, 1959 |
| 2,930,773 | Parry et al. | Mar. 29, 1960 |
| | Renfrew et al. | |